June 9, 1953  G. W. JACKMAN  2,641,047
CUTTING TOOL
Filed July 19, 1951
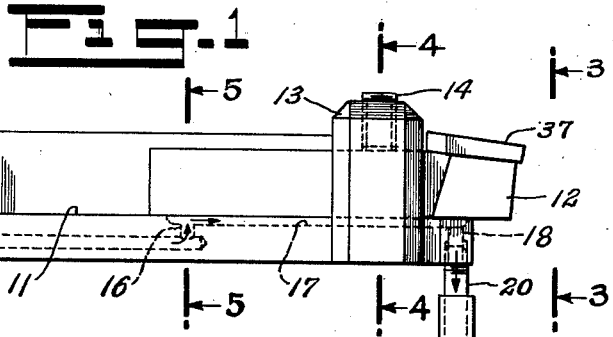
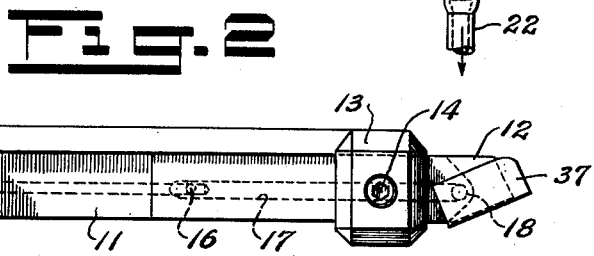
 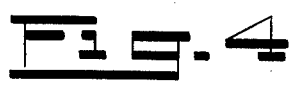 
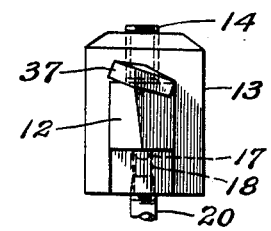 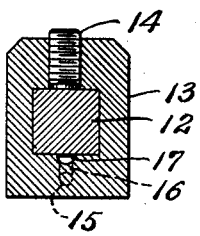 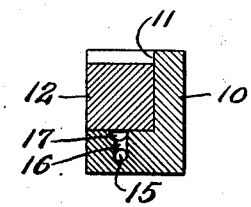
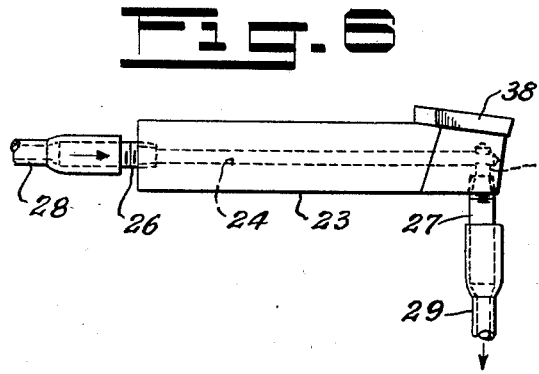 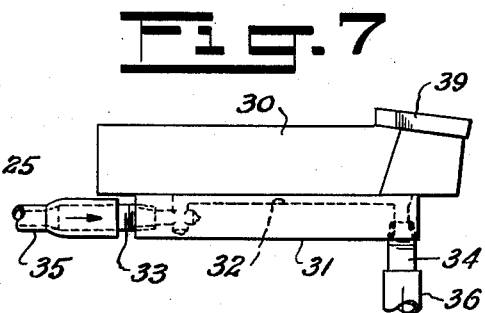
INVENTOR.
GEORGE W. JACKMAN
BY
H. G. Manning
ATTORNEY Patented June 9, 1953

2,641,047

UNITED STATES PATENT OFFICE 2,641,047

CUTTING TOOL

George W. Jackman, Waterbury, Conn., assignor to The Waterbury Farrel Foundry & Machine Company, Inc., Waterbury, Conn., a corporation of Connecticut Application July 19, 1951, Serial No. 237,527

3 Claims. (Cl. 29—95)

This invention relates to the dry-cutting of metals, and more particularly to internally-cooled cutting devices for use in lathes, planers, boring mills, etc.

In metal cutting operations, it is common practice to throw large quantities of a liquid coolant on the cutting tool to prevent it from reaching excessively high temperatures. However, during the process of flooding the cutting tip of the tool, the chip is also flooded and cooled, increasing its shear strength, and, therefore, making it more difficult to machine and deform than if allowed to retain its friction-generated heat.

Accordingly, it is one object of this invention to provide an internally-cooled cutting device which will have longer life than ordinary externally-cooled tools.

It is another object of this invention to provide a cutting tool of the character described wherein the temperature thereof can be controlled without applying coolant to the chip, the working tip of the tool, and the work.

Another object of this invention is to provide a method of cooling a cutting tool whereby its temperature is reduced by the flow of a confined coolant for the even withdrawal of heat, rather than by a series of thermal shocks, as is the case when externally-applied coolant is flooded on the work and the chip continually breaks off, permitting the hot tool to be abrupty quenched.

A further object is to provide a device of the above nature which will be simple in construction, inexpensive to manufacture, which will permit the use of inexpensive coolants and which will be easy to install and manipulate, compact, and very efficient and durable in use.

With these and other objects in view there have been illustrated on the accompanying drawing three forms in which the invention may conveniently be embodied in practice.

In the drawing:

Fig. 1 represents the first form of the invention, wherein the coolant flows within passages of the tool holder and against the underside of the cutting tool held therein.

Fig. 2 is a plan view of the holder and tool shown in Fig. 1.

Fig. 3 is an end view of Fig. 1, taken along the line 3—3 thereof.

Fig. 4 is a vertical cross-sectional view taken along the line 4—4 of Fig. 1.

Fig. 5 is a vertical cross-sectional view of Fig. 1 taken along the line 5—5 thereof.

Fig. 6 illustrates the second form of the invention, wherein the coolant flows through a central channel in the tool itself.

Fig. 7 represents the third form of the invention, wherein the cutting tool rests on a tool-supporting member having a water coolant groove facing the underside of the tool.

Referring now to the drawing, in which like reference numerals denote corresponding parts throughout the several views, the numeral 10 indicates a tool holder, provided with a longitudinal rectangular corner cut-out portion 11 within which the cutting tool 12 may be slidably adjusted. Means is provided to hold the tool 12 securely seated in the tool holder 10, said means comprising a yoke bridge portion 13, at the forward end thereof, embracing the tool 12 and fitted with a vertical set screw 14.

In accordance with the first form of the invention, illustrated in Figs. 1 through 5, the tool holder 10 is provided with a longitudinal coolant flow channel 15 extending from the rear portion of the tool holder 10 to a position just forward of the central portion thereof, where said channel connects with an upwardly extending opening 16 communicating with the floor of the cut-out portion 11. A longitudinal groove 17 communicating at one end with the opening 16 and at its other end with a vertical opening 18, extends through the bottom of the tool-holder 10 for completing the flow passage through the tool holder.

The outer ends of the channel 15 and the opening 18 are fitted with nipples 19, 20, whereby inlet and outlet coolant conduits or hoses 21, 22, respectively, may be connected. It is to be noted that the coolant, in flowing through the groove 17 of the tool holder 10 will contact the under-surface of the tool 12 to conduct heat therefrom along substantially its entire length.

Fig. 6 represents a second form of the invention, which comprises a cutting tool 23, modified by having drilled therethrough a longitudinal channel 24, extending from the rear end thereof nearly to the front end, where it communicates with a downwardly extending channel 25 opening to the underside of the tool. The tool 23 is likewise furnished with inlet and outlet nipples 26, 27 and inlet and outlet hoses or conduits 28, 29 through which the coolant is pumped.

Fig. 7 represents a third form of the invention, and comprises an ordinary cutting tool 30, seated against a longitudinal tool support member 31 which is provided with a longitudinal groove 32 facing the underside of the tool. The groove 32 communicates at its ends with inlet and outlet nipples 33, 34, connected with conduits 35, 36, respectively, as in the other forms of the invention.

*Operation*

In use, the improved tool holder and cutting tool shown in Figs. 1 through 5 will be set and secured in a metal working machine, such as a lathe, in the usual way. Coolant will then be pumped through the inlet conduit 21 and channels 15 and 17 where is will absorb heat and carry it away through the outlet conduit 22. By adjusting the rate of flow of coolant through the tool holder, the temperature of the cutting tip 37 of the tool 12 may be controlled for maximum cutting efficiency and long tool life.

The modified form shown in Fig. 6 operates similarly—heat being conducted from within the tool itself to maintain its cutting tip 38 at controlled temperature. The improved tool illustrated in Fig. 6 will be set in any conventional tool holder of the cutting machine being used.

The modified form of the invention shown in Fig. 7 requires that the tool support and tool be clamped together in cutting position on the machine by any desired means, not shown. Heat will be conducted from the tip 39 through the bottom side of the tool 30 by the coolant flowing thereagainst, as is the case in the construction shown in Fig. 1.

One advantage of the invention herein disclosed is that it provides a method for controlling the temperature of the cutting edge of a tool without cooling the workpiece or the chip.

Another advantage resides in the fact that the tool is cooled by an even withdrawal of heat, instead of by a series of thermal shocks, as is true in the case where the tool and work are quenched by external flooding with a coolant.

Another advantage of the dry cutting method herein disclosed is that it eliminates obscuring of layout marks on the work piece, as is the case when the tool is cooled by externally applied coolant.

Another advantage is that coolant is prevented from flowing or splashing in or on the bearings and guides of the cutting machine being used.

Another advantage resides in the fact that a machine can be used at high speeds without the necessity of coolant splash guards.

Another advantage is that the steam and odor due to coolant being applied directly to the hot cutting tip and work are practically eliminated.

Another advantage is that the cheapest type of coolant may be employed as it does not come in contact with either the machine bearings or operator.

While there have been disclosed in this specification three forms in which the invention may be embodied, it is to be understood that these forms are shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a liquid cooling device for reducing the temperature of a cutting tool and its carbide tip without applying coolant to the exterior of said tool or tip, the work or the chips being removed therefrom, an elongated holder, a cutting tool secured to said holder, an open groove in said holder, communicating with a liquid coolant supply channel extending to the rear of said holder, and with a forward outlet channel leading said coolant away from said tool, means to clamp said tool on said holder, the contact of said coolant with the undersurface of said tool while passing through said confined groove under said tool serving to remove heat continuously from said tool and maintain said tip at the desired cutting temperature.

2. The invention as defined in claim 1, in which said holder is angle-shaped in transverse cross section, to provide a rigid side shoulder against which said tool may be slidably adjusted and clamped.

3. The invention as defined in claim 1, in which said holder is provided with a yoke upstanding from its base for embracing said tool, and a set screw is mounted in the top of said yoke engaging said tool and locking it in any desired adjusted position.

GEORGE W. JACKMAN.

References Cited in the file of this patent

UNITED STATES PATENTS

| Number | Name | Date |
|---|---|---|
| 522,588 | Chouteau | July 10, 1894 |
| 822,122 | Hathorn | May 29, 1906 |
| 857,690 | Toon | June 25, 1907 |
| 1,814,882 | Zinslen | July 14, 1931 |
| 2,234,454 | Richter | Mar. 11, 1941 |
| 2,552,463 | Searles | May 8, 1951 |

FOREIGN PATENTS

| Number | Country | Date |
|---|---|---|
| 488,358 | Great Britain | July 5, 1938 |
| 505,234 | France | May 1, 1920 |

OTHER REFERENCES

American Machinist, April 2, 1951, page 66.